Feb. 23, 1937.　　　　J. R. JOHNSON　　　　2,071,980
MACHINE TOOL
Filed Oct. 23, 1935　　　2 Sheets-Sheet 1
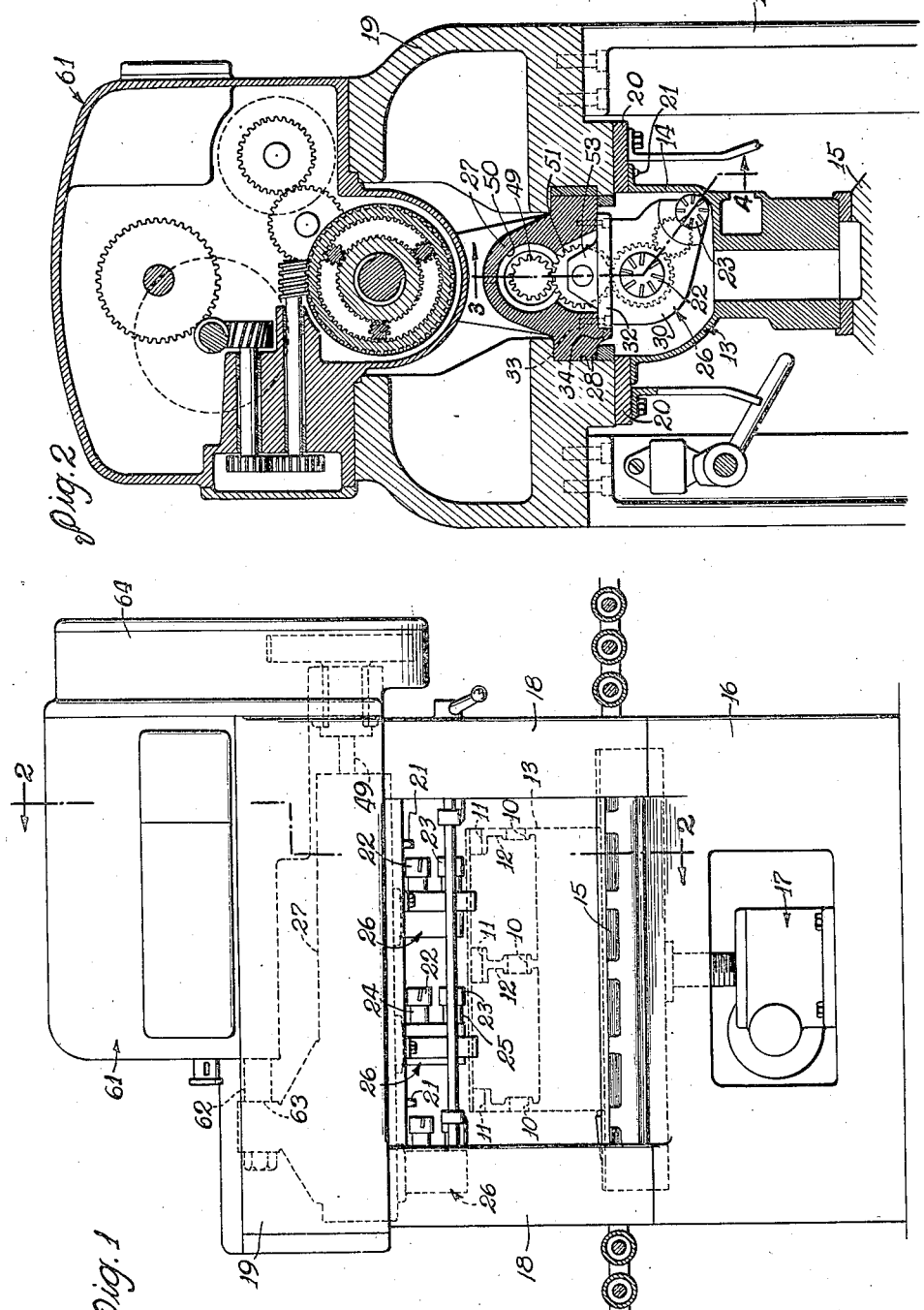
INVENTOR
John R. Johnson
By Parker, Carlson, Pitzner & Hubbard
ATTORNEYS Feb. 23, 1937. J. R. JOHNSON 2,071,980
MACHINE TOOL
Filed Oct. 23, 1935 2 Sheets-Sheet 2
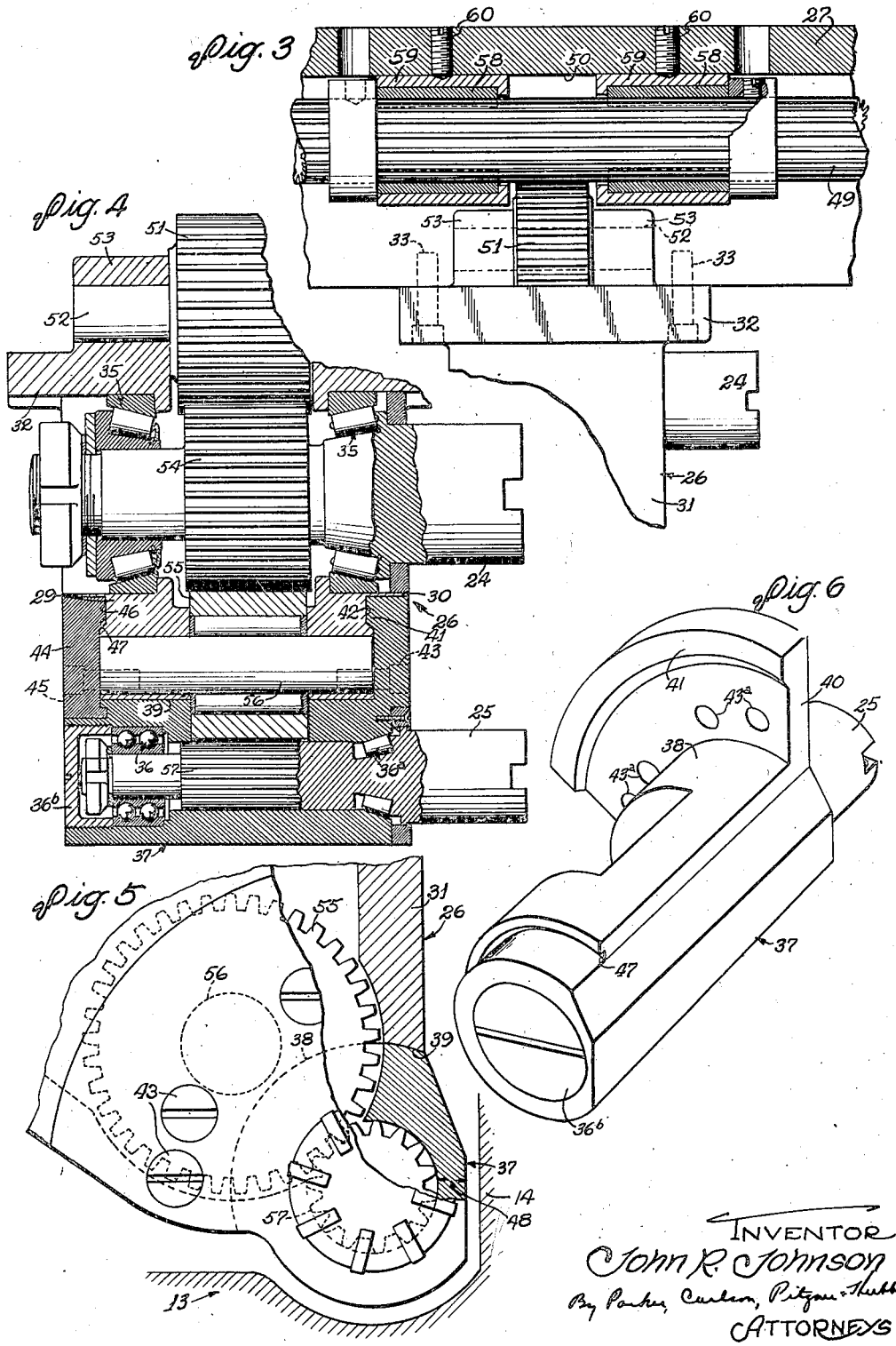
INVENTOR
John R. Johnson
By Parker, Carlson, Pitzner & Hubbard
ATTORNEYS Patented Feb. 23, 1937

2,071,980

UNITED STATES PATENT OFFICE 2,071,980

MACHINE TOOL

John R. Johnson, Rockford, Ill., assignor to The Ingersoll Milling Machine Company, Rockford, Ill., a corporation of Illinois Application October 23, 1935, Serial No. 46,303

6 Claims. (Cl. 77—3)

This invention relates generally to machines for performing boring, reaming, and allied metal-removing processes and more particularly to the machining of the crank and cam shaft bearing recesses of internal combustion engine blocks.

One object of the invention is to provide a machine for the above purpose having a novel mounting of the tools which enables the machine to be changed over readily and adapted, without material alterations in construction, to changes in the positions of bearing recesses in the block.

Another object is to provide a novel tool mounting in a machine of the above character for supporting the cam shaft tools with the desired rigidity in spite of the location of the cam shaft recesses closely adjacent one side wall of the block.

Still another object is to provide a novel mounting for the crank and cam shaft hole boring tools which facilitates the location of the tool axes with a high degree of accuracy with respect to each other and with respect to the crank case flange.

A further object is to provide a new and improved means for driving the tools and feeding the same relative to the work in a crank and cam shaft boring machine of the type in which the tools are carried by projections mounted on a common support and enter the open end of the crank case.

Other objects and advantages of the invention will become apparent from the following detailed description taken in connection with the accompanying drawings, in which Figure 1 is a side elevational view of a boring machine embodying the novel features of the present invention.

Fig. 2 is a cross sectional view taken along the line 2—2 of Fig. 1.

Figs. 3 and 4 are fragmentary sectional views taken along the line 3—4 of Fig. 2.

Fig. 5 is a fragmentary side elevational view of the cutter saddle, part of which is shown in section.

Fig. 6 is a perspective view of the lower part of the cutter saddle.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown in the drawings, the invention is embodied in a machine tool arranged to bore and ream simultaneously the cam shaft holes 10 and the half bearing recesses 11 in the end walls and cross webs 12 of an internal combustion engine block 13. The cam shaft holes are in this instance located closely adjacent a side wall 14 of the crank case.

Preferably, the block, while being operated upon, is supported in inverted position upon a table or platen 15 mounted for vertical movement in a base structure 16 and adapted to be raised and lowered by a suitable power actuated mechanism indicated at 17. Upstanding from the base 16 are posts 18 rigidly connected at their upper ends by a super-structure 19 carrying hardened plates 20 against which the crank case flange of the block 13 is pressed and positioned accurately by dowel pins 21 when the platen 15 is elevated to working position.

The bearing recesses in each web 12 are, in the present instance, machined by a pair of cylindrical cutters 22 and 23 fast on parallel spindles 24 and 25 which project laterally from an arm or saddle 26 projecting downwardly from an elongated support or carriage 27. The arms 26 are spaced to correspond to the spacing of the holes to be bored so that the arms and the cutters thereon will enter the crank case openings between the webs 12 as the block is raised to working position as shown in Fig. 2. By locating the cutter axes accurately with respect to the clamping plates 20, the dowel pins 21 and with respect to each other, it will be observed that the tools will be positioned accurately with respect to the axes of the openings to be formed as an incident to raising the block into its working position.

The carriage 27 is of rigid construction and supported at opposite side edges by spaced guideways 28 formed in the super-structure 19. The carriage is thus adapted for endwise reciprocation parallel to the axes of the recesses to be bored, so that after the block has been raised to working position, all of the holes in the different webs and end walls will be bored simultaneously as the carriage is fed forwardly.

In order to render the machine readily adaptable to changes in the spacing in the bearings in the engine block, the saddles 26 for the different pairs of tools are made as separate detachable units adapted to be mounted in various positions along the carriage 27. Herein each saddle comprises a housing having spaced walls 29 and 30 integrally joined by a wall 31. At its upper end, the housing has a flange 32 which may be secured by means of bolts 33 in any desired position along the underside surface of the carriage 27 which is machined accurately and formed with a flange 34 for the purpose of locating the saddle 26 with the required precision.

The walls 29 and 30 support anti-friction bearings 35 in which are journaled the spindle 24 carrying the cutter 22 for boring the crank shaft recess. The spindle 25 carrying the tool for boring the cam shaft recess is journaled in anti-friction bearings 36 and 36ᵃ on a separately formed part 37 detachably secured to the lower end of the saddle housing. The part 37 is of generally tubular construction and is formed with an accurately machined surface 38 concentric with the axis of the spindle 25 and fitting accurately in an arcuate seat 39 (Fig. 5) formed at the lower end of the housing 26. By making this seat and the mating surface 38 of semicircular contour, it will be observed that these surfaces may be machined readily and located with a high degree of accuracy both vertically and horizontally with respect to the axis of the spindle 24.

To enable the bearing support formed by the part 37 to be made of maximum strength, it is clamped in its seat by means which does not occupy any of the narrow radial space between the cutter spindle and the adjacent end wall 14 of the engine block. To this end, a right angular arm 40 is formed on one end of the part 37 for abutment with the wall 30 of the saddle. The arm 40 is generally segmental in shape and has an inturned flange or tongue 41 also concentric with the axis of the spindle 25 and adapted to seat in a correspondingly shaped groove 42 in the wall 30 in which the flange is held by screws 43 passing through holes 43ᵃ in the arm 40 and threading into the wall 30 into the housing proper.

The opposite end of the tube 37 is held in place by a separate plate 44 clamped by a series of screws 45 against the wall 29 of the saddle housing and having flanges 46 which seat in arcuate grooves 47 formed in the end of the tube 37 and the wall 29.

By virtue of the separate mounting provided for the bearings 36 of the spindle 25, it will be apparent that this mounting may, by proper selection of materials, be made of the strength required to provide proper lateral support for the spindle in spite of the extremely close spacing in some engine blocks between the axis of the cam shaft recess and the adjacent wall 14 of the engine block. Thus the part 37 would be formed from strong alloy steels and this, coupled with the spindle mounting above described, provides the necessary rigidity while at the same time enabling the width of the section 48 and therefore the spacing of the cam shaft recess from the wall 14 to be reduced to a minimum while at the same time permitting the cutter to be supported with sufficient rigidity to enable the recesses to be bored at high speed with the extreme accuracy which is required. To enable the strength of the mounting for the spindle 25 to be increased further, the anti-friction elements 36ᵃ adjacent the cutter 23 run in raceways integral respectively with the spindle itself and the tube 37. The bearing 36 may be held in place by a cap 36ᵇ threading into the end of the tubular member 37 opposite the cutter.

The cutter spindles 24 and 25 on all of the saddles are preferably rotated from a common shaft 49 disposed externally of the block during the boring operation and having permanent drive connections with the cutters on the respective saddles. To facilitate changing the spacing of the saddles 26, the shaft 49 extends axially of a channel 50 formed in and extending longitudinally of the carriage 27 and defined by a cylindrical surface which is interrupted at the lower side to form an opening through which power may be taken from the shaft at any point along its length. As shown in Fig. 3, the shaft 49 is formed throughout its length with gear teeth meshing at spaced points with spur gears 51 on shafts 52 which are supported in upstanding lugs 53 on each saddle.

The gear 51 meshes with a gear 54 on the spindle 24, the latter in turn driving a gear 55 on a shaft 56 and meshing with teeth 57 cut directly on the spindle 25 intermediate the supporting bearings 36 thereof so as to minimize the radial space required for the bearings.

The drive shaft 49 is rotatably supported at opposite ends in bearings (not shown) and to provide bearing supports for the shaft adjacent each point of power take-off, internally toothed collars 58 meshing with gear teeth on the shaft are journaled in bearing bushings 59 fitting snugly within the channel 50 and held in place by set screws 60. Since the bushings may be adjusted longitudinally of the channel and the collars 58 may be positioned at any point along the spline shaft 49, it will be apparent that the shaft bearings may, without alteration in construction, be shifted readily to accommodate changes in the points of the power take-off.

Any suitable means may be employed for driving the shaft 49 and feeding the carriage 27 along its slideway in automatic cycles of feed and rapid return motions. For this purpose, it is preferred to employ a self-contained motor driven power feeding and tool rotating mechanism 61 of the character disclosed in a copending application Serial No. 723,136, filed by Alexander Oberhoffken on April 30, 1934. This unit may be mounted stationarily upon the super-structure 19 with its feed screw 62 connected to a lug 63 on the carriage 27. Power for rotating the shaft 49 is transmitted from the unit through gears contained in a housing 64.

I claim:

1. A machine for silmultaneously boring the crank and cam shaft bearing recesses in the spaced webs of an engine block comprising, in combination, a plurality of alined cutters for boring the crank shaft recess, a plurality of alined cutters for boring the cam shaft recesses mounted to turn on an axis parallel to said first mentioned cutters, a support extending along the crank case opening of said block, parallel arms projecting from said support and spaced to enter between the adjacent webs upon movement of the support and block toward each other, said arms providing bearing supports for the spindles of the respective crank shaft boring cutters and each having a seat at the free end thereof, a plurality of separately formed tubular members each fitting in one of said seats and providing a bearing for the spindle of one of said cam shaft cutters, and means at opposite ends of each of said members detachably and rigidly holding the member in the seat.

2. A machine for simultaneously boring the crank and cam shaft bearing recesses in the spaced webs of an engine block comprising, in combination, a plurality of alined cutters for boring the crank shaft recess, a plurality of alined cutters for boring the cam shaft recesses mounted to turn on an axis parallel to said first mentioned cutters, a support extending along the crank case opening of said block, parallel arms projecting from said support and spaced to enter between the adjacent webs upon movement of the support and block toward each other, said arms providing bearing supports for the spindles of the respective crank shaft boring cutters and each having a seat at the free end thereof, a plurality of separately formed tubular members each fitting in one of said seats, a lateral extension formed integral with one end of each member and lying alongside the associated arm, a plate lying alongside of the member and the other side of said arm and having tongue and groove connections with the member and the arm, said extension and said plate being secured detachably to said arm whereby to hold the tubular member firmly against said seat.

3. A machine for simultaneously boring a plurality of the bearing recesses in an engine block having, in combination, an elongated support disposed opposite and extending parallel to the crank case opening in the block to be bored, a plurality of rigid arms spaced apart according to the spacing of the bearings to be bored and each detachably secured to said support, a plurality of cutters each rotatably mounted on one of said arms and positioned thereon for boring one of said recesses, a plurality of gear trains each terminating at the spindle of one of said cutters, means on said support providing an elongated channel into which said gear trains extend, a shaft disposed within said channel and having a driving connection with each of said gear trains, and means providing bearing support for said shaft adjacent each of said gear trains comprising a bushing seated in said channel and adjustable longitudinally thereof, and a collar journaled in said bushing and having a driving connection with said shaft permitting of adjustment of the collar along the shaft.

4. A machine for simultaneously boring crank and cam shaft bearing recesses in a cross web of an engine block comprising, in combination, a support disposed opposite the crank case opening of the block to be bored, a projection on said support extended into said opening when the block and support are moved toward each other, said projection providing a bearing for a spindle carrying a cutter for boring the crank shaft recess in said web when the block is in working position, a tubular member having a convex side surface and providing a bearing for a spindle carrying a tool for boring the cam shaft recess in said web, a concave surface on said projection providing a seat for receiving the convex surface of said member with the bearing axis of the latter extending parallel to the crank bearing axis, and means for fastening said member in said seat with said axes located in the proper positions when the block is disposed in said working position, said member being formed structurally separate from said projection whereby to permit the member to be constructed of material capable of providing rugged support for the cam shaft boring tool with the cam shaft recess located closely adjacent a side wall of the crank case.

5. A machine for simultaneously boring crank and cam shaft bearing recesses in a cross web of an engine block comprising, in combination, a support disposed opposite the crank case opening of the block to be bored, a projection on said support extended into said opening when the block and support are moved toward each other, a spindle rotatably supported in said projection and carrying a boring cutter for operating upon said crank shaft recess, a spindle carrying a tool for boring the cam shaft recess in said web, a member rigidly fastened to said projection providing a bearing for said cam shaft tool spindle disposed parallel to the crank shaft spindle, and mating surfaces on said projection and member accurately locating the cam shaft boring spindle in proper position relative to said crank shaft spindle, said member being formed structurally separate from said projection whereby to permit the member to be constructed of material capable of providing proper support for said cam shaft spindle when the cam shaft recess is located closely adjacent a side wall of the crank case.

6. A machine for simultaneously boring crank and cam shaft bearing recesses in a cross web of an engine block comprising, in combination, a support disposed opposite the crank case opening of the block to be bored, a projection on said support extended into said opening when the block and support are moved toward each other, a spindle rotatably supported in said projection and carrying a boring cutter for operating upon the crank shaft recess, a spindle carrying a tool for boring the cam shaft recess in said web, a structurally separate tubular member providing a bearing for said last mentioned spindle, and mating surfaces on said projection and member accurately locating the cam shaft boring spindle parallel and in proper position relative to said crank shaft spindle, and flanges at opposite ends of said member projecting laterally from the member and fastened to said projection whereby to clamp the member against said projection.

JOHN R. JOHNSON.